(12) United States Patent
Kim et al.

(10) Patent No.: US 7,651,737 B2
(45) Date of Patent: Jan. 26, 2010

(54) PASTE COMPOSITION, AND A GREEN SHEET, FOR FORMING A DIELECTRIC LAYER, AND A METHOD FOR FORMING A DIELECTRIC LAYER OF PLASMA DISPLAY PANEL

(75) Inventors: Young Hoon Kim, Chungcheongbuk-do (KR); Eun Tae Lee, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 11/319,459

(22) Filed: Dec. 29, 2005

(65) Prior Publication Data

US 2007/0093590 A1    Apr. 26, 2007

(30) Foreign Application Priority Data

Oct. 25, 2005    (KR) .................. 10-2005-0100478

(51) Int. Cl.
*B05D 1/40* (2006.01)
*B05D 3/02* (2006.01)

(52) U.S. Cl. .................... 427/331; 427/372.2
(58) Field of Classification Search ........... None
See application file for complete search history.

(56) References Cited

U.S. PATENT DOCUMENTS

| 5,980,347 | A | | 11/1999 | Udagawa et al. |
| 6,046,121 | A | * | 4/2000 | Masuko et al. ............ 501/20 |
| 6,339,118 | B1 | | 1/2002 | Yamashita et al. |
| 6,635,193 | B1 | | 10/2003 | Fukushima et al. |
| 2002/0052287 | A1 | | 5/2002 | Morita et al. |
| 2004/0212305 | A1 | | 10/2004 | Fujitani et al. |
| 2004/0246204 | A1 | | 12/2004 | Aoki et al. |
| 2005/0271982 | A1 | * | 12/2005 | Setsuda et al. ............ 430/321 |

FOREIGN PATENT DOCUMENTS

| EP | 0877003 A2 | 11/1998 |
| EP | 0987228 A2 | 3/2000 |
| EP | 1003199 A2 | 5/2000 |
| EP | 1093147 A1 | 4/2001 |
| JP | 2000-109341 A | 4/2000 |
| JP | 2001-019474 A | 1/2001 |
| JP | 2005-213058 A | 8/2005 |
| KR | 2000-0017116 A | 3/2000 |
| KR | 10-2006-0009428 A | 2/2006 |
| WO | WO-2004/053915 A1 | 6/2004 |

OTHER PUBLICATIONS

Database WPI Week 200559—Derwent Publications Ltd., London, GB; AN 2005-574681-XP002420135.

* cited by examiner

*Primary Examiner*—Sheeba Ahmed
(74) *Attorney, Agent, or Firm*—Birch, Stewart, Kolasch & Birch, LLP (57) ABSTRACT

An optimized paste composition and green sheet form a dielectric layer of a plasma display panel. A plasma display panel is formed by (a) preparing a green sheet of a film-forming material layer formed by applying a paste composition containing PbO-based powder, a binder resin, a dispersing agent, a plasticizer, and a solvent onto a supporting film; (b) transferring the film-forming material layer of the green sheet onto a substrate with electrodes by using a heating roller; and (c) sintering the film-forming material layer transferred onto the substrate. The result is an excellent dielectric layer formed with minimal processing time, and the dielectric layer has good resistance to high temperature and high pressure.

3 Claims, 7 Drawing Sheets

Within an optimal range

Fig. 5B

Outside an optimal range

Within an optimal
process condition

Fig. 7B

Outside an optimal
process condition

PASTE COMPOSITION, AND A GREEN SHEET, FOR FORMING A DIELECTRIC LAYER, AND A METHOD FOR FORMING A DIELECTRIC LAYER OF PLASMA DISPLAY PANEL

This application claims priority of Korean application no. 2005-100478 filed in Korea on Oct. 25, 2005, the entire contents of which are hereby incorporated by reference.

BACKGROUND OF THE INVENTION

1. Field of the Invention

The invention pertains to a paste composition, a green sheet, for forming a dielectric layer, and a method for forming a dielectric layer of plasma display panel, and the dielectric layer can be formed by a simple process using a green sheet containing an optimized paste composition.

2. Description of the Related Art

Plasma display panels (PDPs) are flat panel display devices that can display images or information by using the light-emitting phenomenon of plasma discharge PDPs generally are divided into DC-types and AC-types according to the panel structure and driving method. PDPs generate visible light obtained from the energy difference when ultra violet light, which is generated by the plasma discharge of a gas (such as He, Xe, etc) provided in each cell, excites a phosphor lining in the cell, which emits a visible photon when returning to the ground state.

The above mentioned PDPs have advantages such as easy manufacturing, simple structure, high brightness, high luminous efficacy, memory capacity, and a wide viewing angle over 160°. PDPs also can be used for wide screens of 40 inches or more.

The structure of a PDP generally includes an upper substrate and an oppositely disposed lower substrate, walls, and cells formed by the two substrates and walls. Transparent electrodes are formed on the upper substrate, and bus electrodes are formed on the transparent electrodes in order to reduce the resistance of the transparent electrodes. Address, i.e., data electrodes are formed on the lower substrate.

The cells divided by walls are lined with phosphors. An upper dielectric layer is formed on the upper substrate to cover the transparent electrodes and the bus electrodes, and a lower dielectric layer is formed on the lower substrate to cover the address electrodes. A protection layer, generally made of magnesium oxide, is formed on the upper dielectric layer.

A related art method for forming the dielectric layers is described below.

FIGS. 1A, 1B, 1C and 1D are cross-sectional views, each showing an exemplary process for forming the dielectric layer of a related art PDP.

Figure 1A:
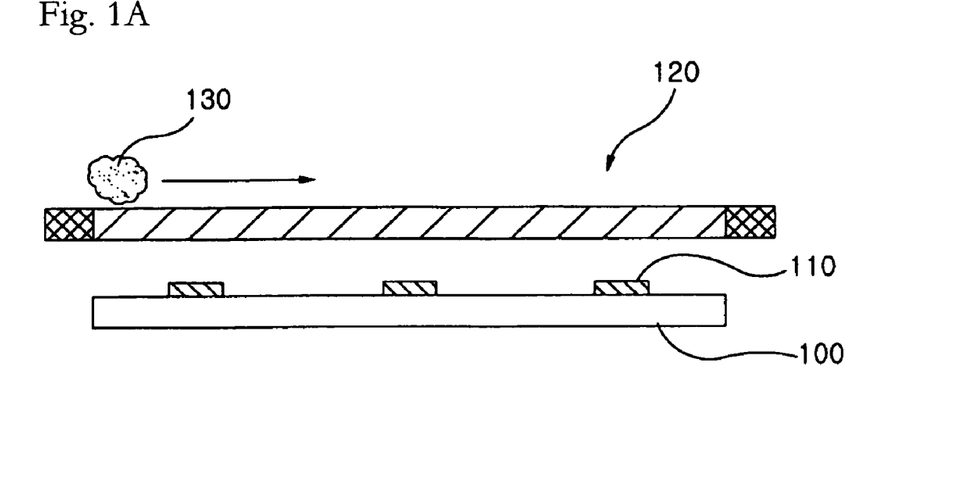
FIGS. 1A, 1B, 1C and 1D are cross-sectional views, each showing a process for forming the dielectric layer of a related art display panel.

FIG. 1A shows a paste composition 130 containing glass powder being prepared and coated on a upper substrate 100 on which transparent electrodes (not shown) and bus electrodes 110 are formed, by a screen printing technique using a mesh 120.

Figure 1B:
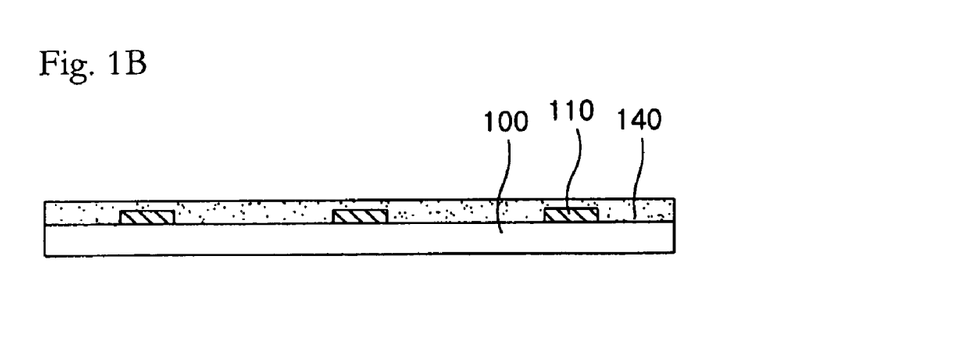

Then, as shown in FIG. 1B, the coated paste composition 130 is dried and plasticized to remove organic components and sinter the glass powder, thereby forming a primary film-forming material layer 140.

Figure 1C:
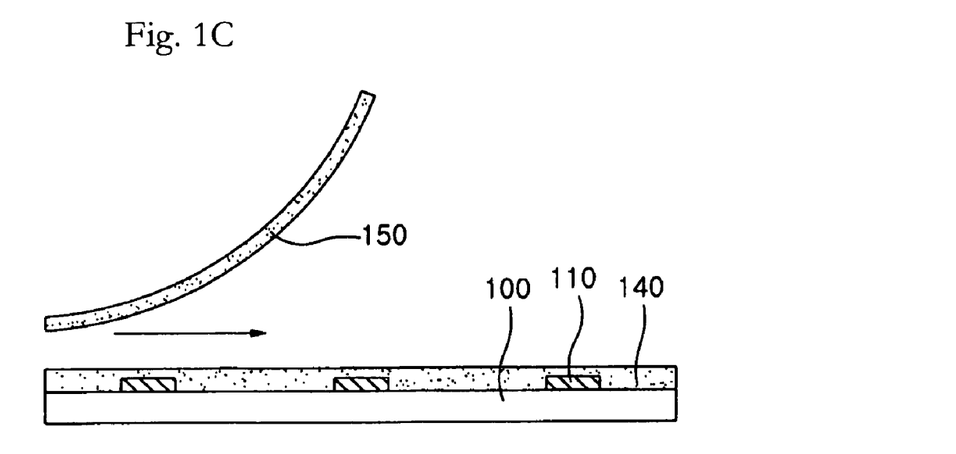

Afterwards, as shown in FIG. 1C, a green sheet 150 including a secondary film-forming material layer is transferred onto the upper substrate 100 on which the primary film-forming layer 140 is formed.

Figure 1D:
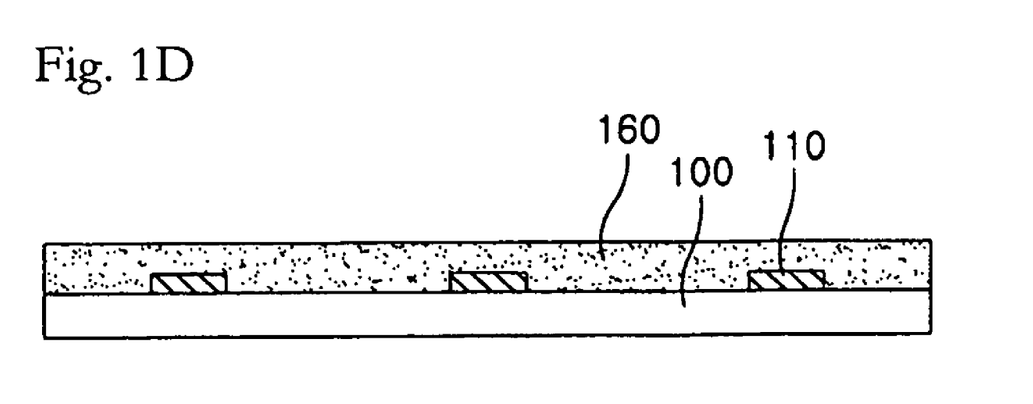

Finally, as shown in FIG. 1D, the green sheet 150 is plasticized to remove organic components and sinter the glass powder, thereby forming a dielectric layer 160.

As described above, in the related art method for forming a dielectric layer 160, the dielectric layer 160 forms by transferring the green sheet 150 after coating the paste composition 130 by using a screen printing technique.

The related art manufacturing process is thus complicated, the manufacturing time is long, and the cost for manufacturing PDPs is high.

Moreover, the dielectric layer is formed by two steps, and holes or cracks may form between the primary film-forming layer 140 and the secondary film-forming layer Further, the thickness of the dielectric layer 160 cannot be uniform.

SUMMARY OF THE INVENTION

An object of the invention is to overcome the disadvantages of the related art.

The invention, in part pertains to a paste composition and a highly serviceable green sheet for forming a dielectric layer, and a method for forming a dielectric layer of a PDP. The dielectric layer may be manufactured through transferring the green sheet to electrodes to yield a product having good resistance to high temperature and high pressure, thereby reducing the processing time and forming a superior dielectric layer.

The invention, in part provides a paste composition and a green sheet for forming a dielectric layer, and a method for forming a dielectric layer of a PDP, where the dielectric layer may be manufactured without defects and with uniform thickness by optimizing the processing conditions of transferring the green sheet onto a substrate.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIGS. 5A and 5B illustrate the dielectric layer of FIG. 2, where FIG. 5A illustrates using the green sheet within the optimal range and FIG. 5B illustrates shows using the green sheet outside the optimal range;

FIGS. 7A and 7B illustrate a substrate for manufacturing the plasma display panel of FIG. 2, where FIG. 7A shows the dielectric layer formed within an optimal process condition range, and FIG. 7B shows the dielectric layer formed outside an optimal process condition range.

DETAILED DESCRIPTION OF THE INVENTION

Hereinafter, embodiments of the invention will be described in detail with reference to the accompanying drawings.

A paste composition for forming a dielectric layer according to one preferred embodiment of the invention contains: about 50 wt % to 70 wt % PbO-based glass powder; about 15 wt % to 25 wt % of a binder resin; about 0.1 wt % to 2 wt % of a dispersing; about 0.1 wt % to 5 wt % of a plasticizer and about 10 wt % to 30 wt % of a solvent.

A green sheet for forming the dielectric layer according to an embodiment of the invention is formed from a supporting film and a film-forming material layer prepared by applying a paste composition containing PbO-based glass powder, a binder resin, a dispersing agent and a solvent, onto the supporting film.

A method for forming a dielectric layer of a PDP according to a preferred embodiment of the invention includes: (a) preparing a green sheet composed of a film-forming material layer formed by applying a paste composition containing a PbO-based powder, a binder resin, a dispersing agent, a plasticizer, and a solvent, onto a supporting film; (b) transferring the film-forming material layer of the green sheet onto a substrate having electrodes by using a heating roller, and (c) sintering the film-forming material layer transferred onto the substrate.

The paste composition and the green sheet for forming a dielectric layer, and the method for forming a dielectric layer of a PDP according to the invention, may transfer a highly serviceable green to the edges of electrodes, and good resistance to high temperature and high pressure result, thereby reducing the processing time and manufacturing a superior dielectric layer.

The invention will be more clearly understood from the following description in conjunction with the following drawings.

Figure 2:
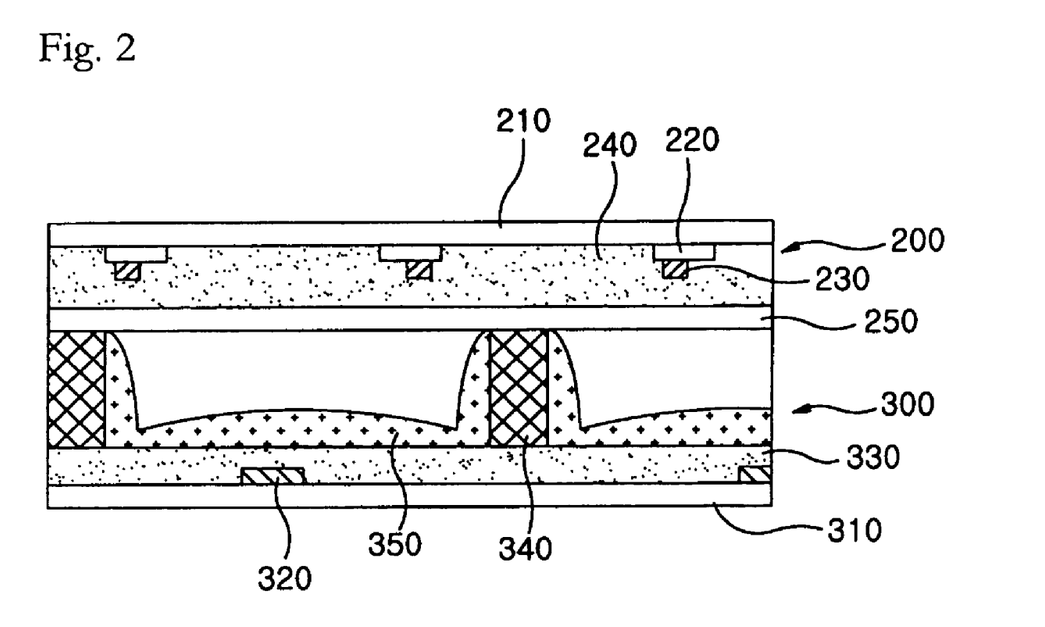
FIG. 2 shows a cross-sectional view of a plasma display according to one preferable embodiment of the invention.

FIG. 2 shows a cross-sectional view of a PDP according to one preferred embodiment of the invention. FIG. 2 shows the structure of the PDP being divided into an upper plate 200 and a lower plate 300.

On the upper plate 200, transparent electrodes 220, bus electrodes 230, an upper dielectric layer 240, and a protection layer 250 are formed on the lower side of a glass substrate 210 (hereinafter, referred to as the "upper substrate").

The transparent electrodes 220 are made of transparent conductive material such as indium tin oxide (ITO) or indium zinc oxide (IZO) to transmit the light generated from the discharge cells.

The bus electrodes 230 are formed on the transparent electrodes 220 in order to reduce the line resistance of the transparent electrodes 220.

The bus electrodes 230 are made of silver (Ad) paste having high conductivity. Since the bus electrodes 230 are made of a material with high conductivity, they reduce the driving voltage of the low conductivity transparent electrodes.

The upper dielectric layer 240, which directly contacts the bus electrodes 230, is made of PbO-based glass in order to avoid chemical reactions with the bus electrodes 230.

The upper dielectric layer 240 restricts discharge current to maintain GLOW discharge, and the electric charges generated at the time of plasma discharge are deposited on the upper dielectric layer 240.

The protection layer 250 prevents damage to the upper dielectric layer 240 from sputtering at the time of plasma discharge, and increases the discharge efficiency of the secondary electrons. The protection layer 250 may be made of magnesium oxide (MgO).

On the lower plate 300 of PDP, a glass substrate 310 (hereinafter, referred to as "lower substrate"), and address electrodes 320, a lower dielectric layer 330, walls 340, and a phosphor layer 350 are formed on the upper surface of the lower substrate 310.

The address electrodes 320 are positioned at about the center of each discharge cell. The address electrodes 320 have a linear width of about 70 to 80 µm.

The lower dielectric layer 330 is formed over the entire surface of the lower substrate 310 and the address electrodes 320, and the lower dielectric layer 330 protects the address electrodes 320.

The walls 340 are positioned on top of the lower dielectric layer 330 at a predetermined distance from the address electrodes 320, and the walls 340 are formed to be longer in the perpendicular direction. The walls 340 are used to maintain the discharge distance and prevent electrical and optical interference between adjacent discharge cells.

The phosphor layer 350 is formed on both sides of the walls 340 and the upper surface of the lower dielectric layer 330. The phosphor layer 350 is excited by the ultra violet light generated at the time of plasma discharge to generate red (R), green (G) or blue (B) visible light.

The light emitting mechanism of a PDP will now be described in detail.

A predetermined voltage (within a voltage margin) between the transparent electrode 220 and the bus electrode 230, when an additional voltage sufficient to generate plasma is applied to the address electrodes 320, forms a plasma between the transparent electrode 220 and the bus electrode 230. A certain amount of free electrons exists in the gas, and a force ($F=q \cdot E$) is exerted to the free electrons when an electrical field is applied to the gas.

If these force-exerted electrons obtain energy (first ionization energy) sufficient to remove electrons in the outermost orbit, they ionize the gas, and the ions and electrons created in the gas move to both electrodes by electromagnetic force. Particularly, secondary electrons are generated when the ions collide with the protection layer 250, and the secondary electrons help to create the plasma.

Thus, a high voltage creates an initial discharge, but once a discharge is initiated, a lower voltage is used as the electron density increases.

The gas provided in the cells of the PDP is generally an inert gas, such as Ne, Xe, He, etc. Particularly, when Xe is under a quasi stable state, an ultraviolet light with a wavelength of between about 147 and 173 nm is generated and applied to the phosphor layer 350 to emit red, green or blue visible light.

The color of visible light emitted from each discharge cell is determined according to the kind of phosphor lining the discharge cell and thus each discharge cell becomes a sub-pixel representing red, green or blue color.

In addition, the color of each discharge cell is controlled by combination of light emitted from the three sub-pixels In case of this exemplary PDP, it is controlled at the time the plasma is generated.

The visible light generated as described above is emitted to the outside of the cell through the upper substrate 210.

The composition and method for forming the upper dielectric layer 240 and the lower dielectric layer 330 will be described below. For convenience, the upper dielectric layer 240 (hereinafter, referred to as the "dielectric layer") is described as an example.

Figure 3:
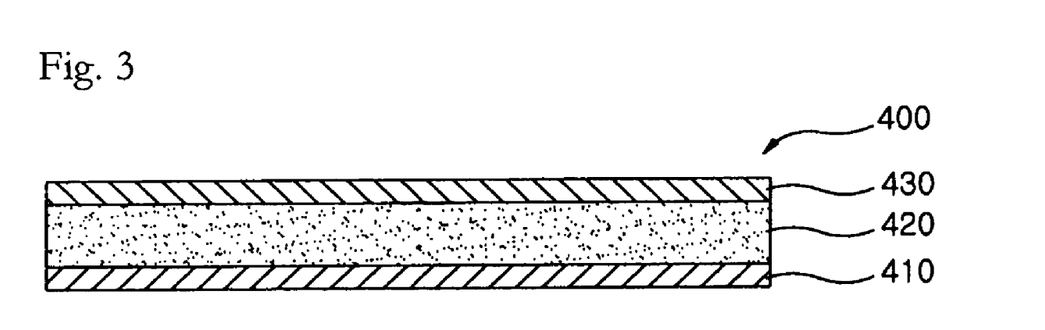
FIG. 3 shows a cross-sectional view of the green sheet for forming a dielectric layer according to a preferable embodiment of the invention.
Figure 4A:
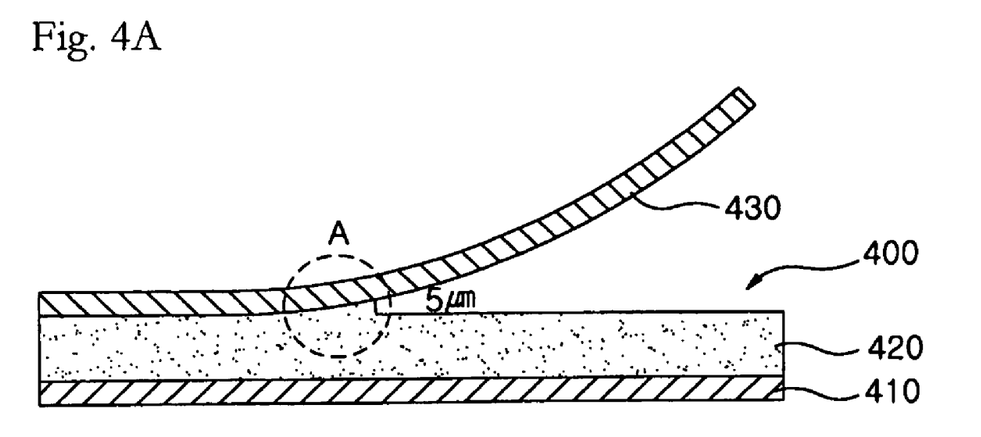
FIGS. 4A and 4B shows cross-sectional views, each illustrating the peeling force of the green sheet of FIG. 3.
Figure 4B:
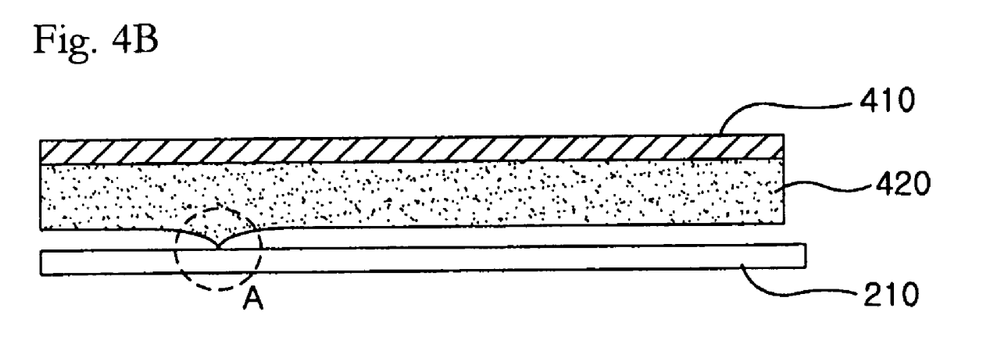
Figure 5A:
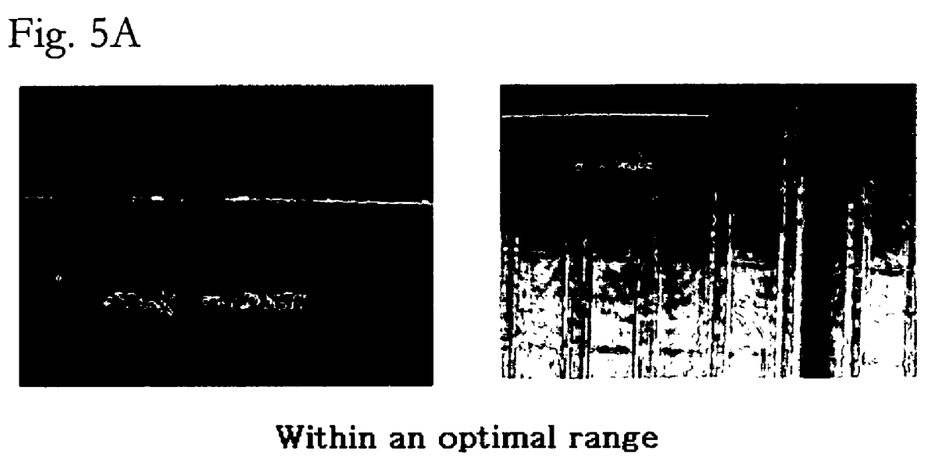
Figure 5B:
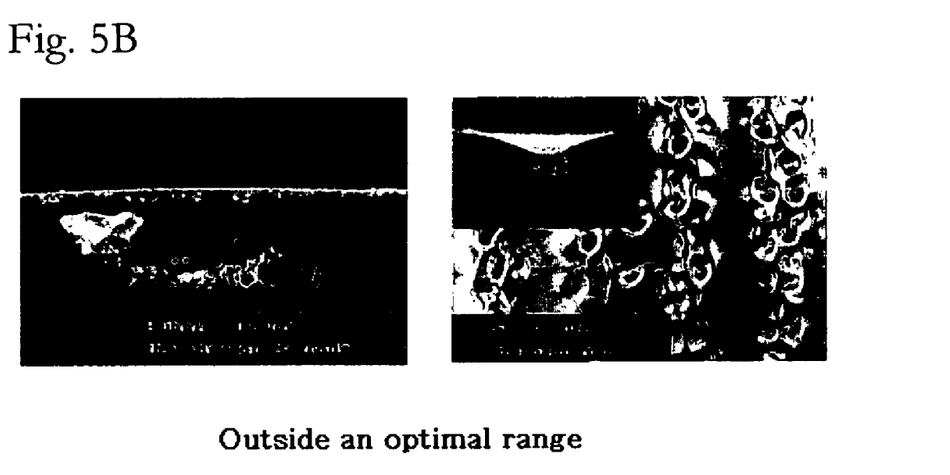

FIG. 3 shows a cross-sectional view of the green sheet for forming a dielectric layer according to a preferable embodiment of the invention FIGS. 4A and 4B are cross-sectional views illustrating peeling force of the green sheet of FIG. 3. FIGS. 5A and 5B illustrate the dielectric layer of the FIG. 2, where FIG. 5A illustrates using the green sheet within the optimal property range, and FIG. 5B illustrates using the green sheet outside the optimal property range.

FIG. 3 shows the green sheet 400 being a suitable sheet for forming a component of a PDP, in particular, the dielectric layer 240. The green sheet 400 includes a film-forming material layer 420 that is formed by coating and drying a paste composition 240 (that will form the dielectric layer) on a supporting film 410. A protection layer 430 is formed on the film-forming material layer 420. Both the supporting film 410 and the protection layer 430 are able to peel off from the film-forming material layer 420.

The supporting film 410 is preferably a resin film with excellent thermal resistance and solvent resistance as well as flexibility. Due to flexibility of the supporting film 410, the paste composition can be coated by using roll coater, blade coater, gravure, meyer rod, etc. Accordingly, the film-forming material layer 420 can be manufactured to have uniform thickness, and also can be stored in roll form.

The film-forming material layer 420 becomes the dielectric layer 240 by plasticizing. The paste composition, which is coated on the supporting film 410 for forming the film-forming material layer 420, contains glass powder, binder resin, dispersing agent, plasticizer, and solvent Preferably, the paste composition also contains antifoaming agent and leveling agent.

It is preferable that the paste composition contains between about 50 wt % and 70 wt % PbO-based glass powder; between about 15 wt % and 25 wt % binder resin; between about 0.1 wt % and 2 wt % dispersing agent; between about 0.1 wt % and 5 wt % plasticizer; between about 10 wt % and 30 wt % solvent; about 1 wt % or less anti-foaming agent and about 1 wt % or less leveling agent More preferably, the composition contains about 0.01 to 1 wt % of the anti-foaming agent and about 0.01 to the 1 wt % of leveling agent.

PbO-based glass is preferably used for the glass powder. Also, lead borosilicate glass or borosilicate glass may be used.

The binder resin may be a methacrylic resin or an acrylic resin, but methacrylic resin is preferable since it has a low decomposition point.

The dispersing agent is a component added to increase the dispersion force of the glass powder, thereby preventing glass particles from precipitating on the film-forming material layer 420. Polyamine amide compounds may be used as the dispersing agent.

The plasticizer is a component added for easy shaping in high temperature by increasing plasticity of the composition. The plasticizer may be a phthalate, an ester, as DOA (dioctyl adipate), DOZ (dioctyl azolate) or mixtures thereof.

It is preferable that the solvent has affinity with inorganic particles and good solubility for the binder resin, sufficient to provide the paste composition with appropriate viscosity. It is also preferable that the solvent vaporize easily when dried. The solvent may be one or a mixture of toluene, PGME (propylene glycol monomethyl ether), EGMEA (ethylene glycol monomethyl ether acetate), PGMEA (propylene glycol monoethyl ether acetate), EA (ethyl acetate), BA (butyl acetate), CYC (cyclohexanone), MEK (methyl ethyl ketone) or acetone. Also, any appropriate solvent or solvent mixture can be used.

The antifoaming agent is added to remove bubbles, and may be selected from hydrocarbons, ethyl-hexanol, or mixtures thereof. The hydrocarbons are preferably $C_6$-$C_{24}$ straight chain or branched hydrocarbons.

The leveling agent is added to increase uniformity of the film-forming material layer 420, and may be at least one of a polyhydroxy carboxylic acid amide or acrylate.

The green sheet comprising the paste composition has a strength of about 100 gf/mm$^2$ to 500 gf/mm$^2$; an elongation rate of about 100% to 2000%; an adhesive force of about 10 gf to 100 gf, a peeling force of about 1 gf/ mm$^2$ to 30 gf/mm$^2$, and a content of residual solvent of about 0.2% to 2%.

The peeling force represents the force of the protection film 430 being peeled off from the film-forming material layer 420. As shown in FIG. 4A, in the process for forming the dielectric layer 240, for several seconds after one end of the protection film 430 is peeled off from the film-forming material layer 420, a portion A of the film-forming material layer 420 in contact with the protection film is attached to the protecting film 430 and stretched upward due to adhesiveness of the film-forming material layer 420.

Thus, when the green sheet 400 is transferred to the upper substrate 210, the portion A of the film-forming layer protrudes, as is shown in FIG. 4B. To form the film-forming material layer 420 with uniform thickness, the height of the portion A should be 5 μm or less. If the height of the portion A is over 5 μm, the property of the dielectric layer 240 in the portion A may deteriorate.

If the peeling force is between 1 gf/mm$^2$ and 30 gf/mm$^2$ as described above, the height of the portion A becomes 5 μm or less.

When the strength, elongation rate, and content of residual solvent of the green sheet 400 are within the above mentioned ranges, the dielectric layer 240 may be formed by the method of transferring the green sheet 400 onto the upper substrate 210 on which the bus electrodes 230 are formed. In order to secure serviceability of the dielectric layer 240 to the edge of the bus electrodes 230, and to not cause any distortion of the green sheet 400, the manufacturing process performed under high temperature and high pressure.

When the dielectric layer 240 is formed by using the green sheet 400 having the above mentioned property range, as shown in FIG. 5A, no bubbles occur around the edge of the bus electrodes 230 and no distortion occurs in the green sheet.

In addition, when the dielectric layer 240 is formed by using the green sheet 400 outside the above-mentioned ranges, as shown in FIG. 5B, a number of bubbles are observed in the dielectric layer 240 and the green sheet 400 is distorted.

EXAMPLES

The experimental results for green sheets formed from the paste composition of the invention will be described in detail below.

Table 1 shows the composition ratios of the paste composition according to Examples 1, 2 and 3. Table 2 shows the properties of the green sheet made up of the paste composition having the composition ratios of Table. 1

TABLE 1

| Component | Powder | Binder resin | Dispersing agent | Plasticizer | Antifoaming agent | Leveling agent | solvent |
|---|---|---|---|---|---|---|---|
| Ex. 1 | 60 | 18 | 1 | 3 | 1 | 1 | 16 |
| Ex. 2 | 63 | 20 | 1.3 | 3 | 0.1 | 0.1 | 125 |
| Ex. 3 | 64 | 22 | 2 | 2 | 0 | 0 | 10 |

TABLE 2

| | Transmissivity (%) | Dispersibility | Withstanding voltage (kV) | Strength (gf/mm$^2$) | Elongation percentage (%) | Adhesive force (gf) | Peeling force (gf/mm$^2$) | Residual solvent |
|---|---|---|---|---|---|---|---|---|
| Ex. 1 | ≧60 | Good | ≧4.0 | 250~300 | ≦600 | 40~70 | ≦20 | ≦1 |
| Ex. 2 | ≧60 | Good | ≧4.0 | 200~300 | ≦1000 | 20~30 | ≦10 | ≦1 |
| Ex. 3 | ≧60 | Good | ≧3.5 | 350~450 | ≦300 | 10~15 | ≦6 | ≦1 |

The paste composition of Example 1 included 60 wt % glass powder, 18 wt % binder resin, 1 wt % dispersing agent, 3 w % plasticizer, 1 wt % antifoaming agent, 1 wt % leveling agent, and 16 wt % solvent.

The paste composition of Example 2 included 63 wt % glass powder, 20 wt % binder resin, 1.3 wt % dispersing agent, 3 wt % plasticizer, 0.1 wt % antifoaming agent, 0.1 wt % leveling agent, and 12.5 wt % solvent.

The paste composition of Example 3 included 64 wt % glass powder, 22 wt % binder resin, 2 wt % dispersing agent, 2 wt % plasticizer, and 10 wt % solvent.

In Examples 1, 2 and 3, the powder is PbO-based glass powder, the binder resin is methacrylic or acrylic resin, the dispersing agent is polyamine amide-based material the plasticizer is a phthalate-based material the antifoaming agent is ethylhexanol the leveling agent is acrylate, and the solvent is toluene or PGME.

The transmissivity refers to transmission at a wavelength of 550 nm. The transmissivities of Examples 1 to 3 were all over 60%.

The dispersability refers to the degree of dispersion of the paste composition, and is determined by whether the coagulation of powder occurs. Examples 1 to 3 all showed good dispersability.

The withstanding voltage is measured to identify the level of bubble generation, and the withstanding voltage decreases as the amount of bubbles increases. Examples 1 to 3 showed withstanding voltages of ≧4.0 kV or ≧3.5 kV, which can be considered good.

The strength of Examples 1 to 3 is between 200 and 450 gf/mm$^2$, which is within the desired range.

Example 2 showed the maximum elongation percentage of 1000 or less, to confirm that it is also within the desired range.

Examples 1 to 3 showed an adhesive force of 10 gf at the maximum and 70 gf at the minimum, which is within the desired range.

Example 1 showed the maximum peeling force of 20 gf/mm$^2$, which is obviously within the desired range.

The content of residual solvent in Examples 1 to 3 is the equal to or less than 1%, which is well within the desired range.

As described above, the green sheet made of the paste composition having such composition ratios showed appropriate properties for practically use in the dielectric layer 240.

Now, the process for forming an upper dielectric layer of a PDP will be described.

Figure 6A:
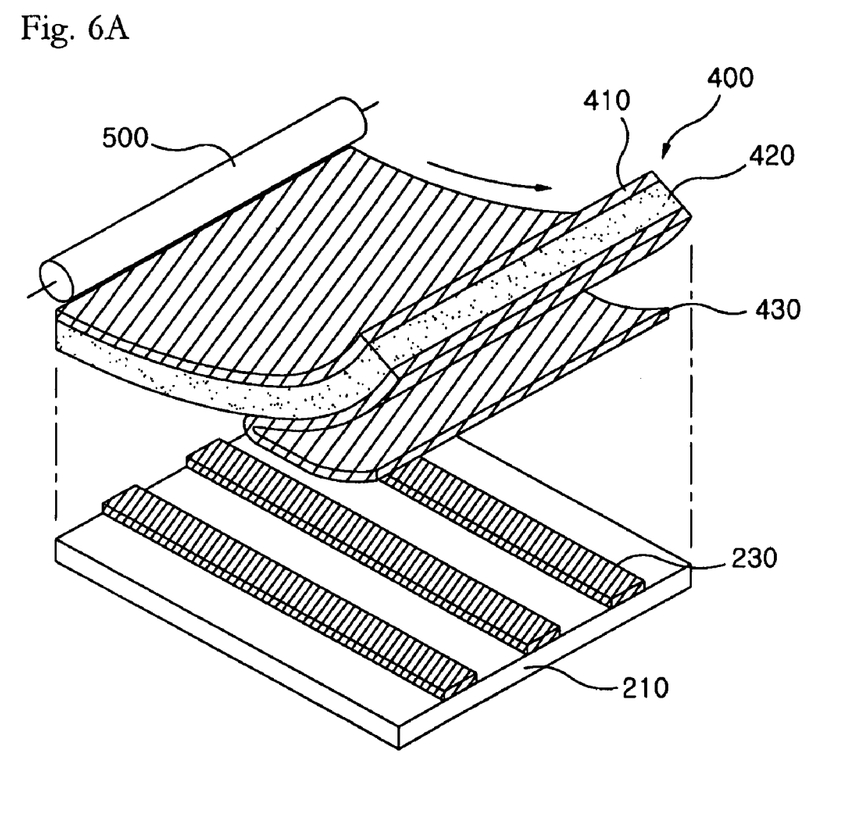
FIGS. 6A, 6B and 6C are cross-sectional views, each illustrating a process for manufacturing the plasma display panel of FIG. 2.
Figure 6B:
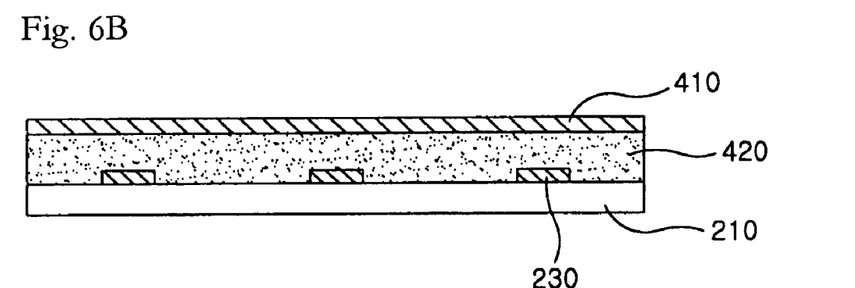
Figure 6C:
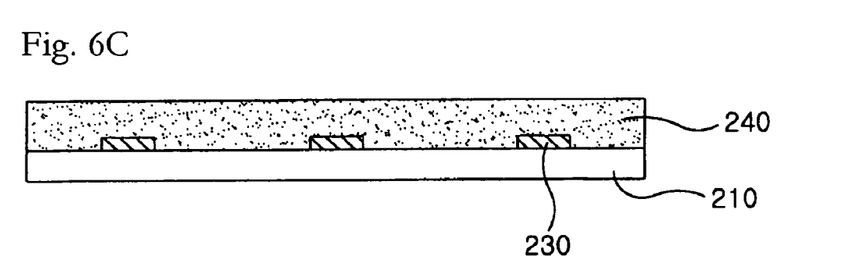
Figure 7A:
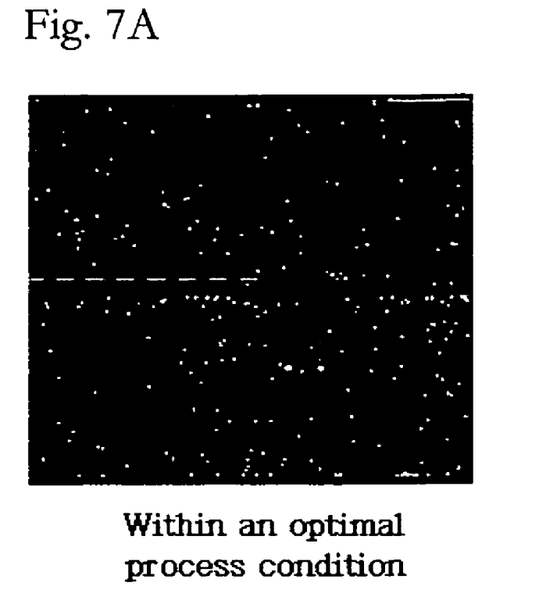
Figure 7B:
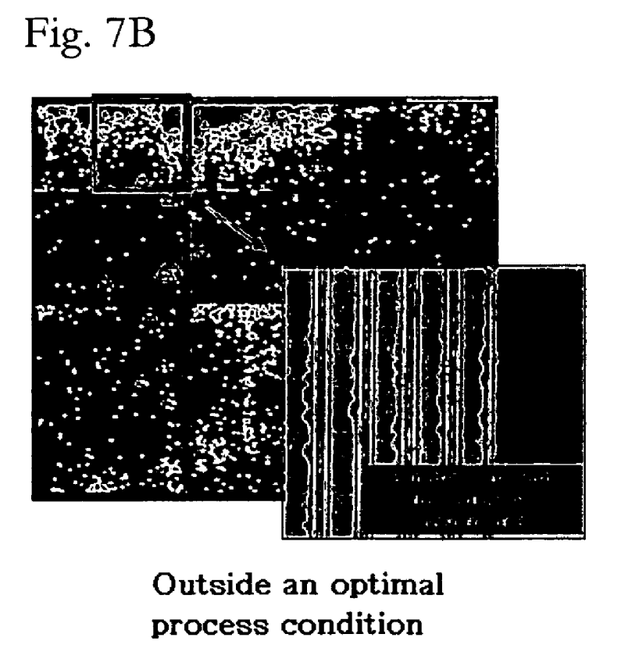

FIGS. 6A, 6B and 6C are cross-sectional views illustrating a process for manufacturing a PDP. FIGS. 7A and 7B illustrate a substrate for manufacturing a PDP, wherein FIG. 7A illustrates the dielectric layer formed under process conditions within the optimal range, and FIG. 7B illustrates the dielectric layer formed under conditions outside the optimal range.

As shown in FIG. 6A, the green sheet 400 is transferred onto the upper substrate 210 on which the transparent electrodes and bus electrodes (not shown) are already formed.

To do so, the protection film 430 is peeled off from the surface of the film-forming material layer 420, and then the green sheet 400 is superposed on the upper substrate 210 so that the surface of the film-forming material layer contacts with the surface of the substrate 210.

Then, as shown in FIG. 6A, the heat roller 500 moves along the green sheet 400 to conduct thermal compression bonding.

By the process described above, the film-forming layer 420 formed on the supporting film 410 is transferred onto the upper substrate 210. For the optimal process condition, the temperature of the heat roller is between 50° C. and 100° C., the pressure of the heat roller is between 2 kgf/cm$^2$ and 10 kgf/cm$^2$, and the distance between the film-forming material layer 420 and the upper substrate 210 should be maintained to 2 mm or less. Moreover, it is preferable that the upper substrate is preheated at a temperature of between 40° C. and 100° C.

Then, the supporting film 410 is peeled off from the film-forming material layer 420 as shown in FIG. 6C, followed by plasticizing the film-forming material layer 420 to form the dielectric layer 240.

As shown in FIG. 7A, it is shown that the dielectric layer 240 manufactured under the optimal process condition contains fewer bubbles around the edge of the bus electrodes 230.

However, as shown in FIG. 7B, the dielectric layer 240 formed outside the optimal process conditions contains many bubbles around the edge of the bus electrodes 230.

As described above, one of the many advantages of the invention resides in that the paste composition and the green sheet for forming the dielectric layer and the method for forming the dielectric layer of PDP according to the invention can provide an excellent dielectric layer and reduce the processing time, by using the method to form the dielectric layer by transferring a highly serviceable green sheet to the edge of each electrode on a substrate. The result is good resistance to high temperatures and high pressures.

Another advantage of the invention arises from that the green sheet for forming the dielectric layer and the method of forming the dielectric layer of PDP can optimize the process conditions for transforming the green sheet onto the substrate, thereby providing a defect free dielectric layer with uniform thickness.

The preferred embodiments of the invention have been described for illustrative purposes, and those skilled in the art will appreciate that various modifications, additions, and substitutions are possible, without departing from the scope and spirit of the invention as disclosed in the accompanying claims.

What is claimed is:

1. A method for forming a dielectric layer of plasma display panel, comprising:
   (a) preparing a green sheet comprising a film-forming material layer formed by applying a paste composition onto a supporting film;
   (b) transferring the film-forming material layer of the green sheet onto a substrate having electrodes by using a heating roller; and
   (c) sintering the film-forming material layer transferred onto the substrate.
   wherein in the step (b), the substrate is pre-heated at a temperature of between 40° C. to 100° C., a distance between the green sheet and the substrate is maintained about 2 mm or less, a temperature of the heating roller is maintained between about 50° C. and 100° C., a pressure applied onto the green sheet by the heating roller is maintained between 2 kg/mm$^2$ and 10 kg/mm$^2$, and a moving direction of the heating roller and a direction along which the electrodes extend are substantially the same with each other.

2. The method of claim 1, further comprising:
   removing the supporting film.

3. The method of claim 1, wherein the paste composition contains:
   about 50 wt % to 70 wt % of a glass powder comprising PbO;
   about 15 wt % to 25 wt % of a binder resin;
   about 0.1 wt % to 2 wt % of a dispersing agent;
   about 0.1 wt % to 5 wt % of a plasticizer; and
   about 10 wt % to 30 wt % of a solvent.

* * * * *